United States Patent
Smith et al.

(10) Patent No.: US 9,547,836 B2
(45) Date of Patent: Jan. 17, 2017

(54) METHOD AND APPARATUS FOR SCHEDULING MEDIA PROCESSING JOBS ON MULTIPLE PROCESSORS TO MAXIMIZE PROCESSOR UTILIZATION

(71) Applicant: Verizon Patent and Licensing Inc., Basking Ridge, NJ (US)

(72) Inventors: Donald E. Smith, Lexington, MA (US); John David Allen, Richardson, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 650 days.

(21) Appl. No.: 13/931,023

(22) Filed: Jun. 28, 2013

(65) Prior Publication Data

US 2015/0006226 A1    Jan. 1, 2015

(51) Int. Cl.
*G06Q 10/06*    (2012.01)

(52) U.S. Cl.
CPC ............... *G06Q 10/06313* (2013.01)

(58) Field of Classification Search
CPC ........................................... G05B 19/02
USPC .......................................... 700/100
See application file for complete search history.

(56) References Cited

U.S. PATENT DOCUMENTS

| | | | | |
|---|---|---|---|---|
| 4,648,023 A | * | 3/1987 | Powell | G05B 19/41865 700/100 |
| 5,671,361 A | * | 9/1997 | Brown | G06Q 10/06 705/7.23 |
| 6,038,539 A | * | 3/2000 | Maruyama | G06F 9/4881 700/100 |
| 7,346,531 B2 | * | 3/2008 | Jacobs | 705/7.15 |
| 8,266,066 B1 | * | 9/2012 | Wezter et al. | 705/78 |
| 2003/0130820 A1 | * | 7/2003 | Lane, III | 702/184 |
| 2005/0216324 A1 | * | 9/2005 | Maithell | G06Q 10/06 705/7.22 |
| 2011/0022433 A1 | * | 1/2011 | Nielsen et al. | 705/7 |
| 2012/0065944 A1 | * | 3/2012 | Nielsen et al. | 703/1 |

* cited by examiner

*Primary Examiner* — Sean Shechtman

(57) ABSTRACT

An approach is provided for scheduling work order tasks based on an optimization of available resources and an assessment of cost penalty functions for missing work order deadlines, including determining an estimated work order completion time for processing a plurality of tasks associated with a work order on one or more resources, scheduling the plurality of tasks in a processing queue based on the estimated work order completion time, and determining a value of a penalty function for violating a work order deadline.

14 Claims, 9 Drawing Sheets

US 9,547,836 B2

METHOD AND APPARATUS FOR SCHEDULING MEDIA PROCESSING JOBS ON MULTIPLE PROCESSORS TO MAXIMIZE PROCESSOR UTILIZATION

BACKGROUND INFORMATION

Raw studio film footage, usually produced in high resolution at production studios, often needs to be converted or transcoded into multiple formats so that the footage may be distributed by retail businesses that deliver video to an array of devices that their customers use (e.g., televisions, personal computers, tablets, cell phones, etc.). The film footage is generally part of a package called a "work order," which may also include information about the desired output formats and a deadline by which the work order must be completed (e.g., a scheduled release date). Work order scheduling is a complex process because a work order may contain many disparate tasks that different resources are required to handle and because new work orders can arrive at any time and need to be inserted into task flows that are already underway. By way of example, some traditional work schedulers schedule work orders by establishing start times for all work order tasks, but do not allow tasks to start before the scheduled time a required resource becomes available for the task. Also, where tasks have been scheduled in such a way that several work orders will go past their deadlines, some traditional work schedulers would use the size of a missed deadline as the measure of the work order's importance.

Based on the foregoing, there is a need for an approach providing a work order scheduler that schedules work order tasks based on an optimization of available resources and an assessment of cost penalty functions for missing work order deadlines.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for scheduling work order tasks based on an optimization of available resources and an assessment of cost penalty functions for missing work order deadlines are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
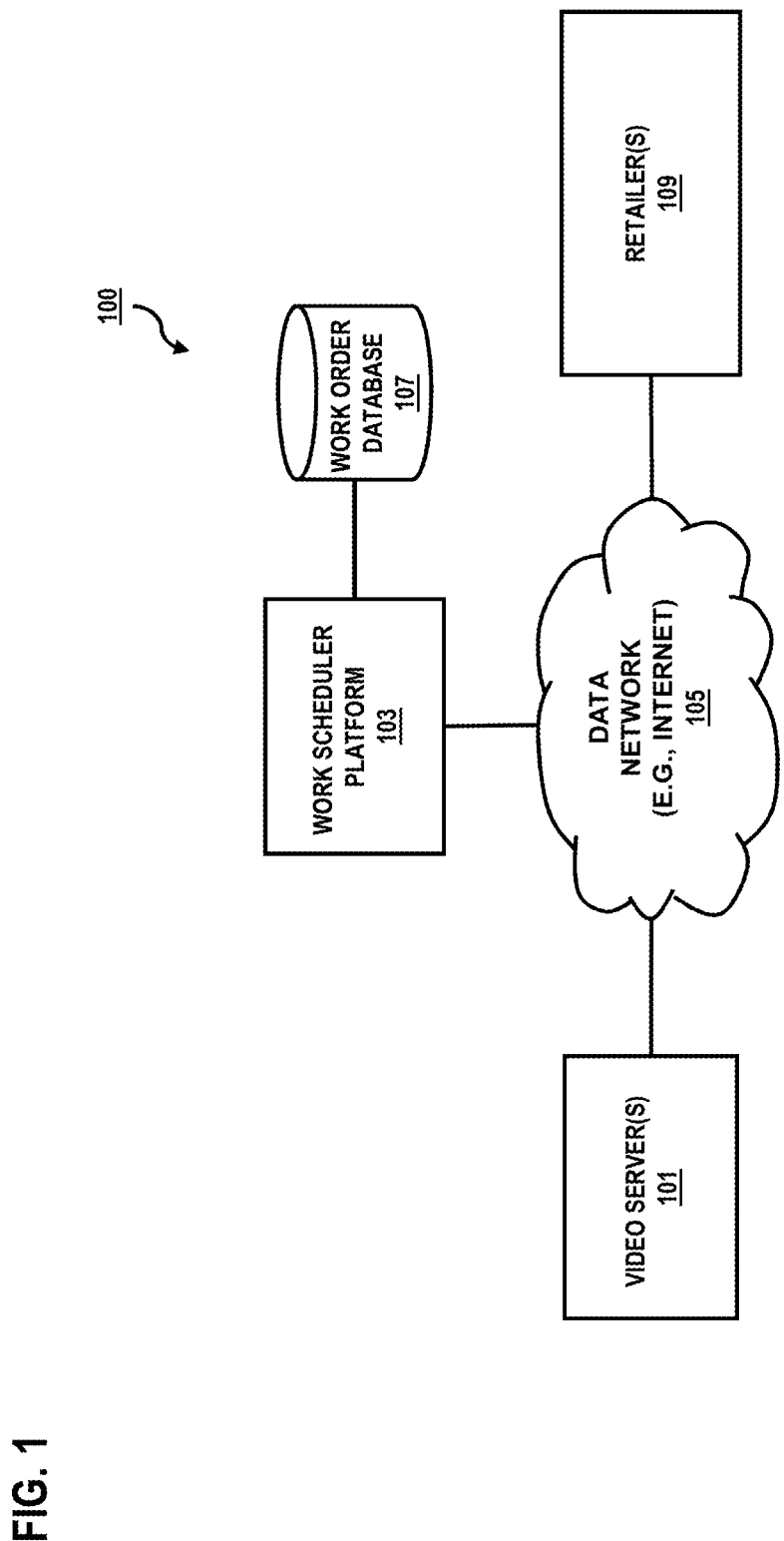
FIG. 1 is a diagram of a system capable of scheduling work order tasks based on an optimization of available resources and an assessment of cost penalty functions for missing work order deadlines, according to one embodiment.

FIG. 1 is a diagram of a system capable of scheduling work order tasks based on an optimization of available resources and an assessment of cost penalty functions for missing work order deadlines, according to one embodiment. As previously discussed, raw studio film footage, usually produced in high resolution at production studios, often needs to be converted or transcoded into multiple formats so that the footage may be distributed by retail businesses that deliver video to their customers such as the Associated Press, Amazon, Hulu, Verizon, and the like to serve an array of devices that their customers use (e.g., televisions, personal computers, tablets, cell phones, etc.). The film footage is generally part of a package called a "work order," which also includes information about the desired output formats and a deadline by which the work order must be completed (e.g., a scheduled release date) and the conversion and transcoding is performed by a work scheduler. As also previously discussed, work order scheduling and processing is complex because a work order can contain many disparate tasks that different resources may be required to handle and because new work orders can arrive at any time and need to be inserted into task flows already underway. By way of example, some traditional work schedulers schedule work orders by establishing start times for work order tasks, but do not allow tasks to start before the scheduled time a required resource becomes available for the task. Further, where tasks have been scheduled in such a way that several work orders will go past their deadlines, some traditional work schedulers use the size of a missed deadline as the measure of the work order's importance. For example, a program that will air tonight has a more critical deadline than one that will air in two weeks but that happens to have today as a deadline.

In particular, a work order requires some or all of the following tasks: ingest (I), or enter the work order into the work scheduler system; transcode (T), or convert the input file into the desired outputs (i.e., the multiple formats required to serve the array of devices used by customers of retail businesses that deliver video); package (P), or assemble the output files into a package (or packages with different set of outputs) for intended recipients (e.g., the retail businesses such as the Associated Press, Amazon, Hulu, Verizon, and the like); and distribute (D), or send packages electronically to recipients. Each main task may include a subsidiary task (e.g., each transcoding of the input into one output format is a subtask for the overall transcoding task). The tasks are executed in the order I, T, P, and D. The set of resources that process one type of work unit are called a "node" (e.g., the T-node's resources are multiple transcoding processors). A work order is a single entity having multiple tasks at a node (e.g., the T-node). The work order's asset may have to be transcoded into multiple formats (possibly in parallel) at the T-node. Only when all the transcodes are done can the work order move to the next stage (e.g., packaging), where it either begins service or it queues for service.

To address this problem, a system 100 of FIG. 1 introduces the capability to schedule work order tasks based on an optimization of available resources and an assessment of cost penalty functions for missing work order deadlines, according to one embodiment. For the purpose of illustration, the system 100 for scheduling work orders from video servers 101 at various production studios (not shown for illustrative convenience) is described with respect to a work scheduler platform 103. By way of example, the video servers 101 may supply the system 100 with a wide variety of content (e.g., one or more media files, customer service agreements, etc.) via a data network 105 (e.g., the Internet). In one embodiment, the work scheduler platform 103 may include or be associated with at least one work order database 107, which may exist in whole or in part within the work scheduler platform 103. In one embodiment, the at least one work order database 107 may include estimated completion times of all work orders in the system 100, actual start times of respective work order tasks at a node (e.g., a T-node), a dollar cost for missing the work order due date by x seconds, and/or task dependencies and/or constraints that might prevent the queue from being served in order (e.g., ingest before transcode, only a certain brand transcoder can perform this task, etc.). While specific reference will be made hereto, it is contemplated that system 100 may embody many forms and include multiple and/or alternative components and facilities.

As seen in FIG. 1, the data network 105 enables the video servers 101 and retailers 109 (e.g., the Associated Press, Amazon, Hulu, Verizon, and other businesses that deliver video to their customers) to access the features and functionality of the work scheduler platform 103. In one embodiment, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

In one embodiment, the system 100 determines a value of a penalty function for violating a work order deadline. The penalty function specifies a financial cost for an actual work order completion time violating the work order deadline. In particular, the actual work order completion time depends on the work order's scheduling and on the actual operation of the one or more resources (e.g., if actual durations turn to differ from estimated durations). In one example use case, a customer's service agreement (e.g., a production studio) associates a penalty function p to the work order (possibly a different p for each work order). Further, p(x) is the dollar cost of missing the work order deadline by x seconds. In one embodiment, it is contemplated that $p(x)=0$ if $x \leq 0$ (i.e., no reward for finishing the work order before the deadline) and that p is increasing for $x>0$. In one embodiment, if $c_n$ is the actual completion time of a work order n and $d_n$ is its due date, then the overall goal of the system 100 is to process as many work orders as possible while keeping all $p_n (c_n - d_n)$ as close to zero as possible.

In one embodiment, the system 100 determines a duration estimate for each of the plurality of tasks (e.g., ingest, transcode, package, and distribute). By way of example, for transcoding at one or more transcoders, the system 100 determines the estimated duration based on a function of the following two parameters: (a) either the size (e.g., number of bytes) of the file associated with the task if processing is byte-limited or the duration of the file if processing is frame-limited; and (b) the type of transcode received and/or required (e.g., input and output formats). In one example use case, a work order may contain tasks A, B, C, D, and E, for example, wherein task A=ingest, B=transcode, C=transcode, D=transcode, and E=package and the work order completion time specified in the customer's service agreement states that the work order completion deadline is 200 minutes from the arrival of the work order from the video servers 101. In one embodiment, the system 100 determines that the estimated duration of task A=10 minutes, task B=40 minutes, task C=50 minutes, task D=60 minutes, and task E=10 minutes.

In one embodiment, the system 100 determines whether any precedence relationships (e.g., processing logic) exist between the plurality of tasks. In this example use case, the system 100 determines that task A must be completed before tasks B, C, and D and tasks B, C, and D must be completed before task E. However, in this example use case, tasks B, C, and D can be executed by the system 100 in any order among themselves.

In one or more embodiments, the system 100 generates one or more sequences for processing the plurality of tasks (e.g., tasks A, B, C, D, and E) to evaluate a resulting estimated work order completion time. In the example use case discussed above, the system 100 can determine that the number of execution sequence permutations is $3!=6$, namely:

Sequence 1—A B C D E
Sequence 2—A B D C E
Sequence 3—A D B C E
Sequence 4—A D C B E
Sequence 5—A C B D E
Sequence 6—A C D B E In one embodiment, the system 100 determines an availability of the one or more resources (e.g., a transcoder for transcoding) since the estimated work order completion time is based on the earliest availability of the one or more resources. In this example use case, the system 100 includes or has access to one Ingest (I) resource, two Transcode (T) resources, and one Package (P) resource (not shown for illustrative convenience).

Figure 2:
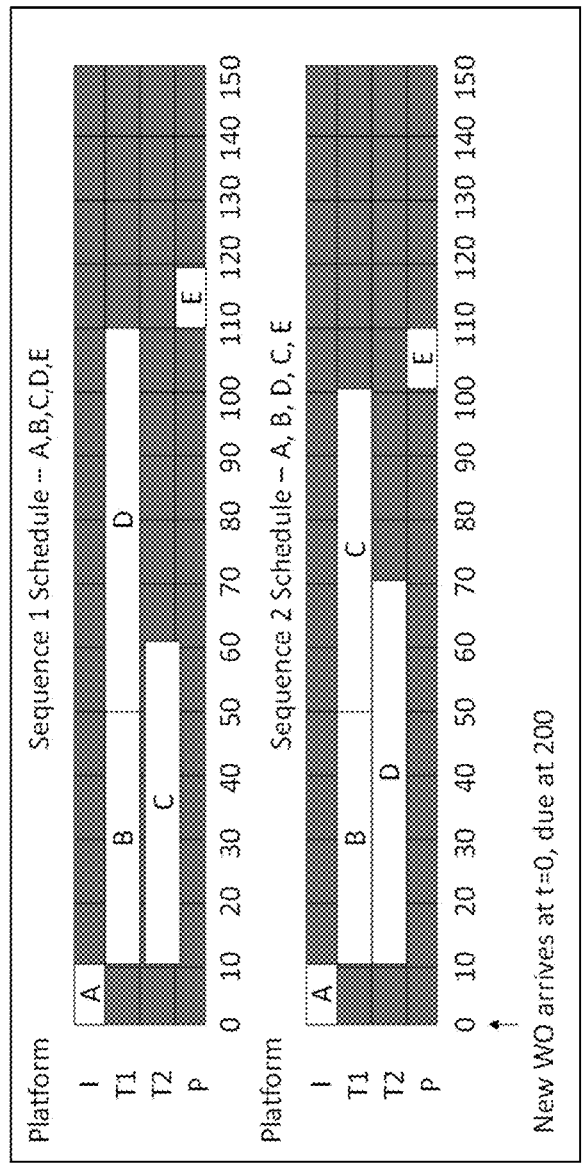
FIG. 2 is a diagram of an example of how task scheduling and submission can determine estimated work order completion times.

In one embodiment, the system 100 determines an estimated work order completion time for processing a plurality of tasks associated with the work order on the one or more resources as illustrated in FIG. 2. More specifically, the system 100 starts task A of Sequence 1 (A, B, C, D, and E) at time 0 on the Ingest platform. The system 100 then schedules task B on the first open Transcode platform (T1) immediately after the system 100 finishes processing task A (e.g., at time 10). Next, the system 100 determines that the second Transcode platform (T2) is also available at time 10 and therefore starts task C in parallel with task B on T2 at that time. The next task in the sequence (e.g., task D) has to wait for the first open spot on either transcode platform before it can begin being processed. Therefore, the system 100 schedules task D on T1 right after the system 100 completes task B. The system 100 then schedules task E to begin on the package platform at the end of task D (e.g., at time 110). Consequently, the system 100 determines that the estimated work order completion time for Sequence 1 is 120 minutes. In one embodiment, the system 100 then schedules Sequence 2 (A, B, D, C, and E) in the same manner. However, in Sequence 2, the system 100 schedules task D before task C on T2 at time 10 rather than at time 50 on T1 as scheduled in Sequence 1. As a result, the system 100 determines that the estimated work order completion time for Sequence 2 is 110 minutes.

In one embodiment, the system 100 schedules the plurality of tasks (e.g., tasks A, B, C, D, and E) in a processing queue based on the estimated work order completion time. More specifically, the system 100 schedules the plurality of tasks based on the scheduled start time of each of the plurality of tasks determined by the system 100 during the evaluation of each possible sequence to determine which sequence has the shortest completion time and/or minimizes the value of the penalty function and therefore should be selected and executed by the system 100. In this example use case, the system 100 determines that of the six possible sequences, none of the sequences finishes sooner than 110 minutes. Therefore, the system 100 places the plurality of tasks in the processing queue in the order of the tasks identified in Sequence 2 (A, B, D, C, and E). In addition, in one embodiment, as soon as one or more resources become available (e.g., a transcode platform), the system 100 searches the processing queue from front to back for one or more of the plurality of tasks that the one or more available resources can process and then the system 100 assigns that task to the one or more resources. In one embodiment, it is contemplated that the last task of the plurality of tasks is completed before the work order deadline (e.g., 200 minutes). Moreover, if the system 100 determines that one or more of the plurality of tasks can benefit from all being executed by the system 100 on the same resource, then the system 100 will attempt to schedule the one or more tasks accordingly.

In one embodiment, the system 100 processes at least one other work order (e.g., an unexpected work order from a production studio) to determine whether scheduling of the other work order will increase the value of the penalty function. In one embodiment, if the other work order increases the penalty, then the system 100 must determine whether to accept the other work order. If the other work order only has a penalty, then the system 100 can accept the other work order without meeting its deadline or reject it. In one embodiment, if any existing work order's penalty increases, then the system 100 decides, by maximizing total revenue minus the overall penalty function, if the benefit of accepting the new order outweighs the penalty of missing the other work order's due date.

In one embodiment, wherein the scheduling of the other work order increases the value of the penalty function, the system 100 initiates a rescheduling of the plurality of tasks in the processing queue based on minimizing the value of the penalty function. By way of example, the system 100 may be processing a work order that is due in 24 hours (W1) and then the system 100 receives another work order (W2) from the servers 101, for example, that is due in one hour and one of the plurality of tasks associated with W1 is currently scheduled to use a resource that W2 also needs. In this example use case, the system 100 reschedules the plurality of tasks (e.g., unfinished tasks of W1 and the plurality of tasks of W2) iteratively by first temporarily rescheduling all future tasks in the schedule that the system 100 has not yet begun processing. In one embodiment, the system 100 then arranges the new and rescheduled tasks in decreasing order of their work order's penalty factor value. Because the system 100 determines that W2 is currently late, the system 100 schedules the plurality of tasks associated with W2 before the remaining tasks associated with W1. The system 100 then updates each unscheduled task's penalty value to allow the system 100 to schedule a work order near its deadline prior to a work order that has a further deadline (i.e., a lower penalty value). Thereafter, the system 100 places the other work order and the unscheduled tasks temporarily back in the processing queue, one at a time in the order just calculated, using the method for scheduling the plurality of tasks discussed above. If the system 100 determines that the resulting schedule allows both work orders to complete on time, the system 100 makes the temporary schedule permanent.

In one embodiment, if the system 100 determines that the new temporary schedule still has a late work order, then the system 100 recalculates the value of the penalty function since the schedule of one or more of the plurality of tasks may have changed and the estimated work order completion time may have changed accordingly. In one embodiment, the system 100 reorders the plurality of tasks according to their revised work order penalty factor. The system 100 then removes the temporarily scheduled plurality of tasks and the system 100 schedules the original plurality of tasks according to the new value of the penalty factor. More specifically, it is contemplated that the system 100 continues until either all of the work orders (e.g., W1 and W2) are scheduled to complete on time or the system 100 reaches an iteration count limit. In the latter case, the system 100 returns the plurality of tasks associated with W1 to their original schedules and the other work order (W2) is scheduled late according to its original scheduling.

In one or more embodiments, it is contemplated that the at least one work order, the plurality of tasks, or a combination thereof are not related to media files. By way of example, a construction company may want to build a number of homes in a large residential development. In one embodiment, the construction company can utilize the system 100 to complete all of the homes on time and/or minimize the value of the penalty function associated with failing to complete all of the homes on time. For example, the system 100 can treat each house as a work order, the subcontractor tasks (e.g., framing, roofing, painting, plumbing, etc.) as the plurality of tasks, and each subcontractor crew (e.g., framers, roofers, painters, plumbers, etc.) as the one or more resources for completing the plurality of tasks.

Figure 3:
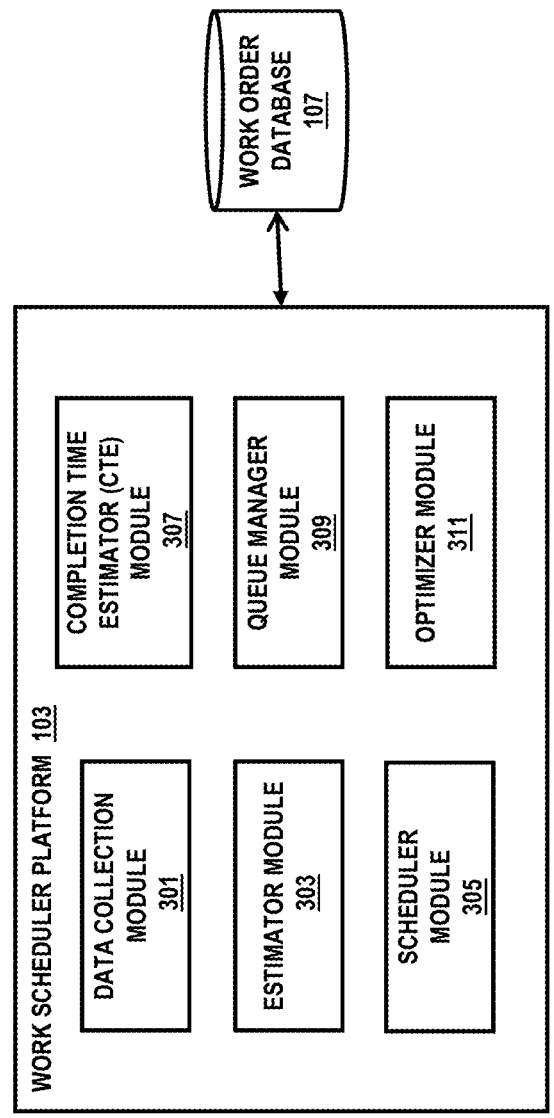
FIG. 3 is a diagram of the components of a resource manager platform, according to one embodiment.

FIG. 3 is a diagram of the components of the work scheduler platform 103, according to one embodiment. By way of example, the work scheduler platform 103 includes one or more components for scheduling work order tasks based on an optimization of available resources and an assessment of cost penalty functions for missing work order deadlines. It is contemplated that the functions of these components may be combined in one or more components or performed by other components of equivalent functionality. In this embodiment, the work scheduler platform 103 includes a data collection module 301, an estimator module 303, a scheduler module 305, a completion time estimator (CTE) module 307, a queue manager module 309, and an optimizer module 311.

In one embodiment, the data collection module 301 is used to determine the value of a penalty function for violating a work order deadline. More specifically, the data collection module 301 determines the value from the penalty function p in a customer's service agreement, wherein p(x) is the dollar cost of missing the due date by x seconds. The data collection module 301 also may be used to determine the work order deadline from the customer's service agreement. Further, the data collection module 301 may be used to determine any precedence relationships between one or more of the plurality of tasks.

In one embodiment, the estimator module 303 is used to determine an expected duration of each of the plurality of tasks associated with a work order. For example, for transcoding at the one or more transcoders, the estimator module 303 determines the expected duration based on a function of the following two parameters: (1) either the size (in bytes) of the file associated with the task if processing is byte-limited or the duration of the file if processing is frame-limited; and (2) the type of transcode (e.g., the input or output formats). Once the estimator module 303 determines the duration estimate, it passes the estimate to the scheduler module 305.

In one embodiment, the scheduler module 305 is used to generate one or more sequences for processing the plurality of tasks based on the precedence relationships to evaluate a resulting estimated work order completion time. In particular, the scheduler module 305 receives the work order data, including the estimated duration of each task in the work order from the estimator module 303 and any precedence relationships between the tasks from the data collection module 301, respectively. The scheduler module 305 then evaluates each sequence to determine which one of the one or more sequences has the shortest completion time and/or minimizes the value of the penalty function and therefore should be scheduled and executed by the scheduler module 305. If the best sequence allows the work order to be completed on time, then the scheduler module 305 places the particular sequence of the plurality of tasks in a processing queue and the task start times are passed to the queue manager module 309. The scheduler module 305 may also be used to determine when one or more of the plurality of tasks is expected to be executed on each of the one or more resources so that the scheduler module 305 can execute one or more of the plurality of tasks as soon as the one or more requisite resources becomes available to reduce resource idle time. The scheduler module 305 also may be used to process at least one other work order to determine whether scheduling of the other work order will increase the value of the penalty function.

In one embodiment, the CTE module 307 is used to estimate the completion times of all work orders in the work scheduler platform 103 based on the task duration estimates from the estimator module 303, the work order state from the queue manager module 309, and the system configuration information (e.g., the number of resources and their states such as working or failed) from the queue manager module 309. In one example embodiment, the CTE module 307 exists in whole or in part within the scheduler module 305, or independently. More specifically, if one or more of the plurality of tasks are in service, the CTE module 307 determines the estimated completion time based on the actual start time of a task plus the estimated duration of the task. The CTE module 307 next iteratively estimates the start times of the one or more tasks in queue. For example, the first task in the queue eligible to begin service (e.g., the second task) has an estimated start time equal to the first task completion time and the third task starts when the second task completes, and so on. In contrast, the estimated completion time of a task in queue equals its estimated start time plus its estimated duration. In addition, in terms of eligibility to begin service, the CTE module 307 must also take into consideration one or more task dependencies and constraints determined by the estimator module 303, which may prevent the queue from being serviced in order. The CTE module 307 continues in this fashion until it simulates the processing of all of the plurality of tasks in the work scheduler platform 103. Once the CTE module 307 assembles the plurality of tasks back into the work orders from which they came, the CTE module 307 determines the estimated work order completion time. In effect, the CTE module 307 translates the work order state into a schedule from which gaps that would occur if resources sat idle while one or more of the plurality of tasks were in queue are eliminated.

In one or more embodiments, the queue manager module 309 is used to determine an availability of the one or more resources, wherein the estimated work order completion time is further based on the availability. More specifically, the queue manager module 309 tracks the states of the queue and all resources at each node (e.g., a transcoder at a T-node) and passes this information back to the scheduler module 305 when the latter requests its. In one embodiment, the relevant state information includes the following: (1) which one of the plurality of tasks is still in the processing queue; and (2) when each one of the plurality tasks started service. In the example use case where the scheduling of another work order increases the penalty function, the queue manager module 309 may also be used to initiate a rescheduling of the plurality of tasks in the processing queue based on minimizing the value of the penalty function.

In certain embodiments, the optimizer module 311 is used to determine the particular sequence among the one or more sequences generated by the schedule module 305 that minimizes the value of the penalty function. By way of example, to minimize the value of the penalty function, the optimizer module 311 invokes the CTE module 307 for each candidate schedule to calculate all work order completion times. The optimizer module 311, in connection with the data collection module 301, then calculates the associated penalty. In one embodiment, if $\hat{C}_n$ is the estimated completion time of the work order n, and $d_n$ is the due date, the work order's penalty is $p_n(\hat{C}_n - d_n)$. Thereafter, the optimizer module 311 explores the space of schedules until it finds one with the smallest penalty. In one embodiment, it is contemplated that the schedule space includes only reordering of the queue (i.e., the optimizer module 311 can reschedule only tasks that are not yet in service). Consequently, the optimizer module 311 cannot suspend any of the plurality of tasks to free the one or more resources for tasks in the processing queue. In one embodiment, when the optimizer module 311 has determined an optimal schedule, the optimizer module 311 passes the schedule to the queue manager module 309, which translates the schedule into a queue ordering according to the earliest estimated start time first. The optimizer module 311 may also be used when one or more resources fail. In particular, if the optimizer module 311 needs to reschedule one or more of the plurality of tasks on the one or more failed resources, then the queue manager module 309 can send the one or more failed tasks to an "operations console queue," where they can get the system administrator's attention. Therefore, the administrator may try to correct the failure and then resubmit the failed tasks to the one or more recovered resources. Otherwise, since the optimizer module 311 does not preempt one or more of the plurality of tasks in service, the optimizer module 311 inserts the failed task into the processing queue. Conversely, when one or more failed resources recover, the optimizer module 311 can run again and the queue manager module 309 will push one or more tasks to the one or more newly available resources.

Figure 4:
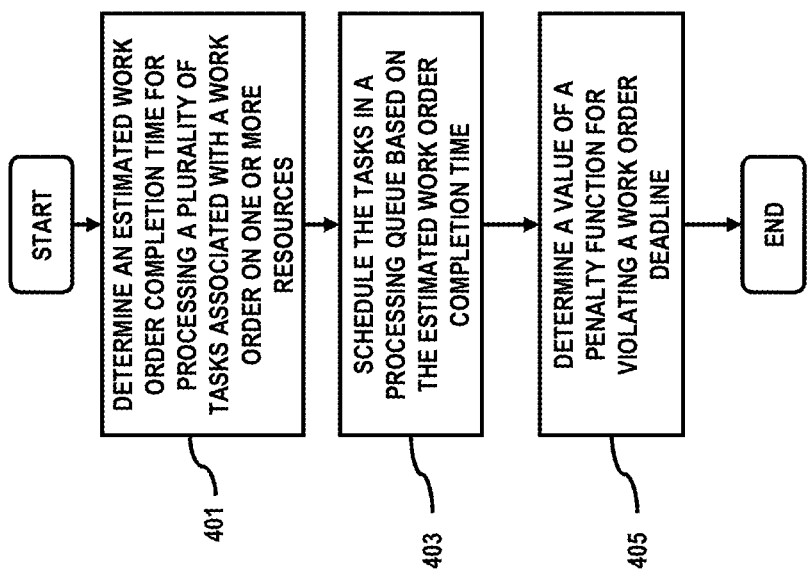
FIGS. 4-6 are flowcharts of processes for scheduling work order tasks based on an optimization of available resources and an assessment of cost penalty functions for missing work order deadlines, according to one embodiment.
Figure 5:
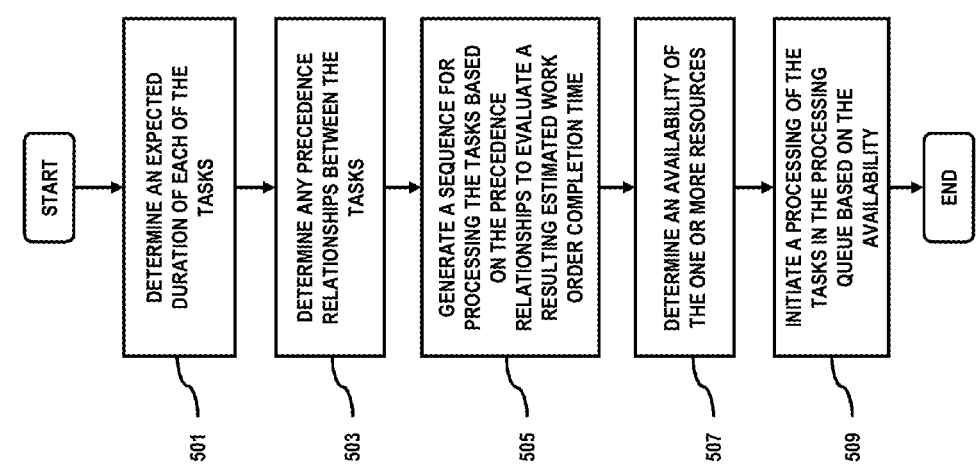
Figure 6:
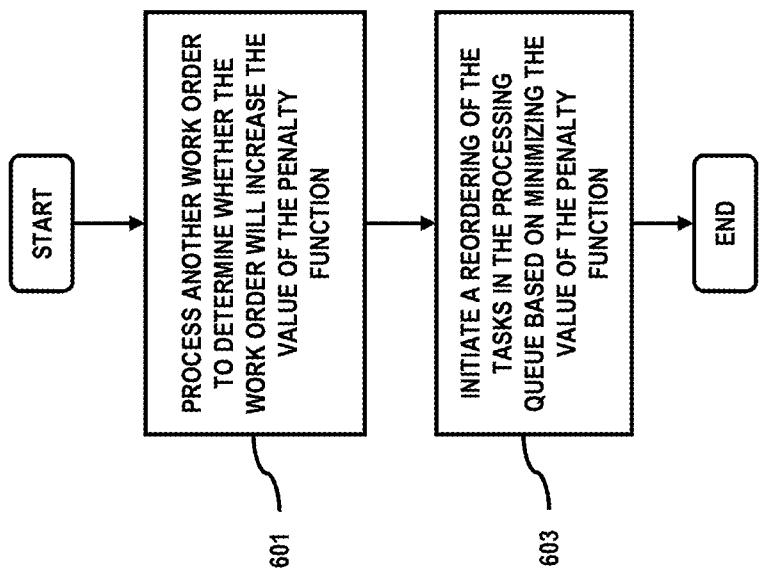
Figure 9:
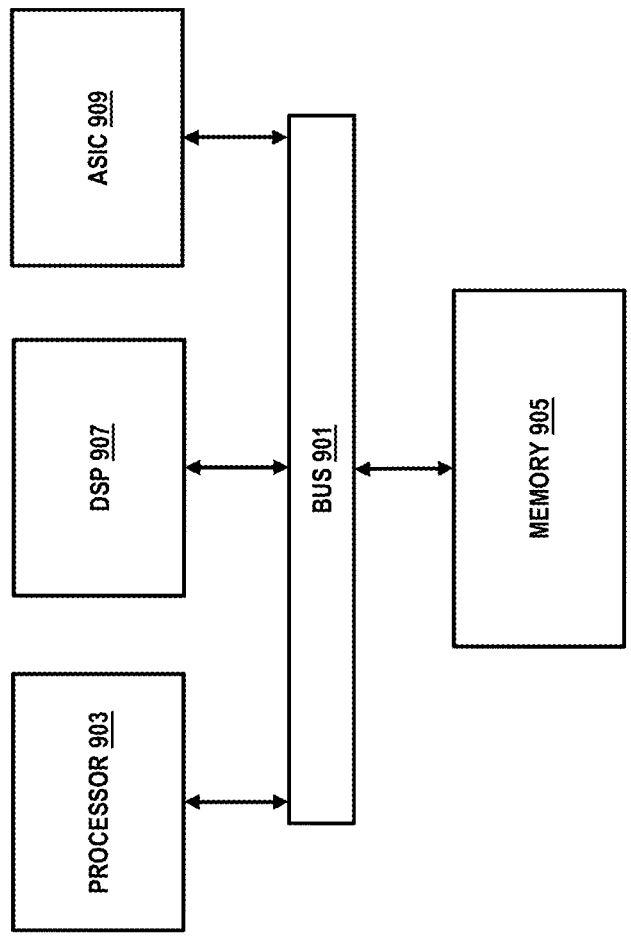
FIG. 9 is a diagram of a chip set that can be used to implement various exemplary embodiments.

FIGS. 4-6 are flowcharts of processes for scheduling work order tasks based on an optimization of available resources and an assessment of cost penalty functions for missing work order deadlines, according to one embodiment. In one embodiment, the work scheduler platform 103 performs the process 400 and is implemented in, for instance, a chip set including a processor and a memory as shown in FIG. 9.

In step 401, the work scheduler platform 103 determines an estimated work order completion time for processing a plurality of tasks associated with a work order on one or more resources. In particular, the work scheduler platform 103 determines the estimated work order completion time based on the sequence of the plurality of tasks that has the shortest completion time and/or minimizes the value of a penalty function for violating a work order deadline. By way of example, in the example use case discussed above, the work scheduler platform 103 determines that of the six possible sequences, none of the sequences finish sooner than 110 minutes. Therefore, the work scheduler platform 103 determines that the estimated work order completion time is 110 minutes, which is 90 minutes less than the 200 minutes completion deadline, for example.

In step 403, the work scheduler platform 103 schedules the plurality of tasks in a processing queue based on the estimated work order completion time. In one embodiment, the work scheduler platform 103 schedules the plurality of tasks based on the scheduled start time of each task determined by the work scheduler platform 103 during the evaluation of each possible sequence by the work scheduler platform 103 to determine which sequence has the shortest completion time and/or minimizes the value of the penalty function and therefore should be scheduled and executed. For example, in the example use case discussed above, the work scheduler platform 103 would place the plurality of tasks in the processing queue in the order of tasks identified in Sequence 2 (A, B, D, C, and E). In addition, in one embodiment, the work scheduler platform 103 searches the processing queue from front to back for one or more of the plurality of tasks that one or more available resources can process and then the work scheduler platform 103 assigns that task to the one or more resources. Further, if the work scheduler platform 103 determines that one or more of the plurality of tasks can benefit from all being executed by the work scheduler platform 103 on the same resource, then the work scheduler platform 103 will attempt to schedule the one or more tasks accordingly.

In step 405, the work scheduler platform 103 determines a value of a penalty function for violating a work order deadline. In one embodiment, the penalty function specifies a financial cost for an actual work order completion time violating the work order deadline. For example, if a customer's service agreement associates a penalty function p to the work order, then p(x) is the dollar cost of missing the work order deadline by x seconds. In one embodiment, it is contemplated that p(x)=0 if x≤0 and that p is increasing for x>0.

FIG. 5 depicts a process 500 of determining the estimated work order completion time for processing the plurality of tasks. In one embodiment, the work scheduler platform 103 performs the process 500 and is implemented in, for instance, a chip set including a processor and a memory as shown in FIG. 9. In step 501, the work scheduler platform 103 determines a duration estimate of each of the plurality of tasks. By way of example, for transcoding the plurality of tasks at one or more transcoders, the work scheduler platform 103 determines the estimated duration based on a function of the following two parameters: (a) either the size (e.g., number of bytes) of the file associated with the task if processing is byte-limited or the duration of the file if processing is frame-limited; and (b) the type of transcode received and/or required (e.g., input and output formats).

In step 503, work scheduler platform 103 determines any precedence relationships between the plurality of tasks, wherein the estimated work order completion time is further based on the duration and any precedence relationships. By way of example, in the example use case discussed above, the work order contains tasks A, B, C, D, and E, wherein task A=ingest, B=transcode, C=transcode, D=transcode, and E=package. Therefore, the work scheduler platform 103 determines that task A must be completed before tasks B, C, and D and that tasks B, C, and D must be completed before task E. However, in this example use case, the work scheduler platform 103 determines that the tasks B, C, and D are the same and therefore can be executed by the work scheduler platform 103 in any order.

In step 505, the work scheduler platform 103 generates one or more sequences for processing the plurality of tasks based on the precedence relationships to evaluate a resulting estimated work order completion time, wherein the schedule of the plurality of tasks is further based on the sequence that minimizes the estimated work order completion time. By way of example, in the example use case discussed above, the work scheduler platform 103 can determine that the number of execution sequence permutations is 3!=6.

In step 507, the work scheduler platform 103 determines an availability of the one or more resources, wherein the estimated work order completion time is further based on the availability. By way of example, in the example use case discussed above, the work scheduler platform 103 starts task A of the Sequence 1 (A, B, C, D, and E) on the ingest platform at time 0. The work scheduler platform 103 then schedules task B on the first open Transcode platform (e.g., T1) immediately after the work scheduler platform 103 finishes processing task A. Next, the work scheduler platform 103 determines that a second transcode platform (e.g., T2) is available at time 10 and therefore starts task C in parallel with task B on T2 at that time.

FIG. 6 depicts a process 600 of processing at least one other work order while the at least one work order is pending. In one embodiment, the work scheduler platform 103 performs the process 600 and is implemented in, for instance, a chip set including a processor and a memory as shown in FIG. 9. In step 601, the work scheduler platform 103 processes at least one other work order to determine whether scheduling of the other work order will increase the value of the penalty function. By way of example, if the work scheduler platform 103 is currently processing a work order that is due in 24 hours (W1) and then the work scheduler platform 103 determines another work order (W2) that is due is one hour and one of the plurality of tasks associated with W1 is currently scheduled to use a resource that W2 needs, the work scheduler platform 103 can determine that scheduling W2 will increase the value of the penalty function since W2 cannot possibly be processed in time given the lack of available resources. As previously discussed, in one embodiment, if only the other work order has a penalty (e.g., the work order will not be completed on time), then the work scheduler platform 103 can accept the other work order without meeting its deadline or reject it. However, if the value of the penalty function for any existing work orders increases, the work scheduler platform 103 decides if the benefit of accepting the other work order outweighs the penalty for missing the other work order's due date based on the total revenue minus the value of penalty function, for example.

In step 603, wherein the scheduling of the other work order increases the penalty function, the work scheduler platform 103 initiates a rescheduling of the plurality of tasks in the processing queue based on minimizing the value of the penalty function, wherein the rescheduling of the plurality of tasks is an iterative process. In one embodiment, the work scheduler platform 103 first unschedules one or more of the plurality of tasks currently in the processing queue. Next, the work scheduler platform 103 arranges the remaining plurality of tasks that have not been processed and the plurality of tasks associated with the other work order in decreasing order of their penalty factor value. The work scheduler platform 103 then updates each unscheduled tasks work order penalty factor value to allow a work order near its deadline to be scheduled prior to a work order far from its deadline. Thereafter, the work scheduler platform 103 temporarily places the other work order and the remaining plurality of tasks back in the processing queue. If the work scheduler platform 103 determines that the work order and the other work order can now be completed on time, the work scheduler platform 103 makes the temporary schedule permanent. However, if new temporary schedule still has a late work order, then the work scheduler platform 103 recalculates the value of the penalty function since some work order task schedules may have been shifted and the work order completion times may have changed. The work scheduler platform 103 then reorders the remaining plurality of tasks and the plurality of tasks associated with the other work order according to their work order's revised penalty value. In one embodiment, the work scheduler platform 103 continues rescheduling the plurality of tasks until either all work orders are scheduled to complete on time or an iteration count limit is exceeded.

Figure 7:
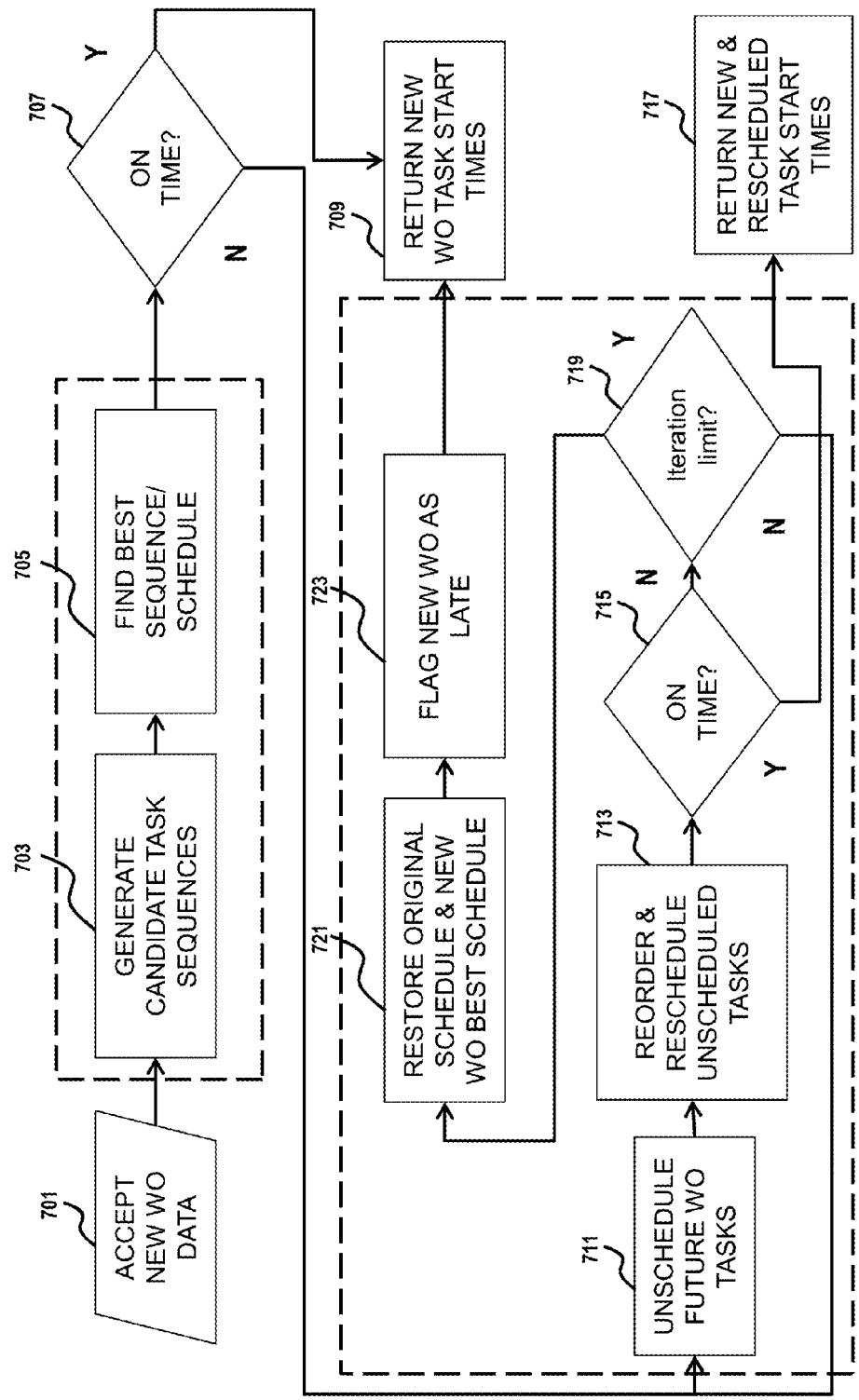
FIG. 7 is a diagram of a work flow for scheduling work order tasks based on an optimization of available resources and an assessment of cost penalty functions for missing work order deadlines, according to one embodiment.

FIG. 7 is a diagram of a work flow for scheduling work order tasks based on an optimization of available resources and an assessment of cost penalty functions for missing work order deadlines. More specifically, FIG. 7 depicts a processing of another work order (e.g., from a production studio) while at least one work order is already being processed by the system 100. In step 701, the system 100 accepts another work order from a video server including one or more media files, one or more output formats, and a work order deadline. In step 703, the system 100 generates a number of task sequences based on any precedence relationships between the tasks (e.g., the ingest task must occur before the transcode task). In step 705, the system 100 evaluates each sequence to determine which sequence has the shortest completion time and/or minimizes the value of the penalty function and therefore should be scheduled and executed by the system 100. If the system 100 determines in step 707 that the selected sequence enables the work order to be completed on time by the system 100, then the system 100 places the work order in the processing queue in step 709 based on the respective task start times.

If, however, the system 100 determines in step 707 that the selected sequence will not enable the work order to be completed on time, then the system 100 in step 711 will unschedule all future tasks in the processing queue that have not begun execution. In step 713, the system 100 reorders and reschedules the new and all unscheduled tasks in decreasing order of their work order penalty factor value. If the system 100 determines in step 715 that the resulting schedule allows all work orders to complete on time, then the system 100 in step 717 makes the temporary schedule permanent and the new work order is placed in the processing queue based on the new and rescheduled task start times. If, however, the system 100 determines in step 715 that the resulting schedule will not enable the work order to be completed on time, then the system 100 determines in step 719 whether the system 100 has exceeded an iteration count limit. If the system 100 determines in step 719 that the iteration count limit has been reached, then the system 100 returns the unscheduled tasks to their original schedules in step 721 and the new work order is scheduled late in step 723 according to its original schedule. Conversely, if the system 100 determines that the iteration count limit has not been reached then the system 100 once again unschedules all future tasks in the schedule that have not begun execution in step 711.

Figure 8:
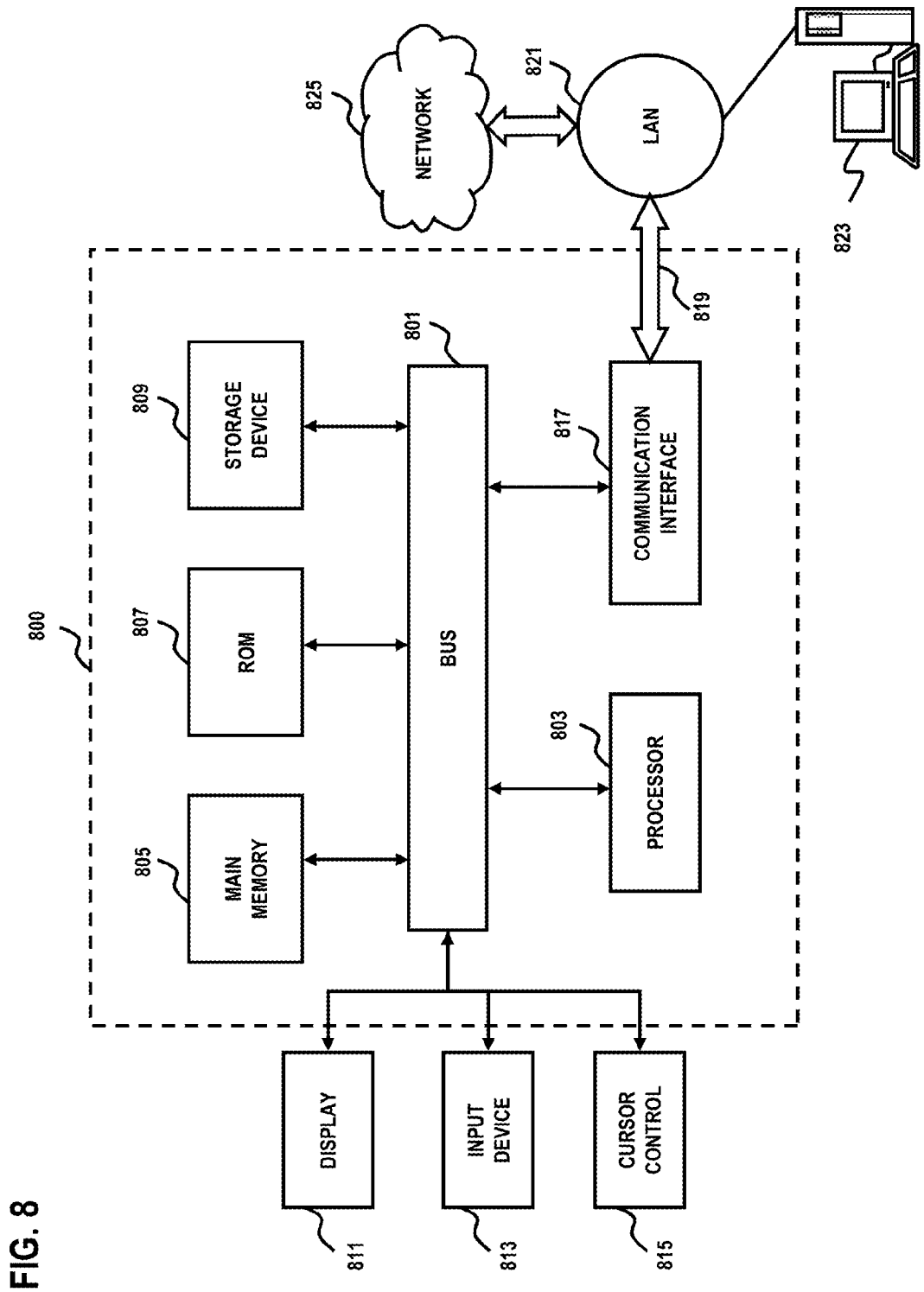
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set 900 upon which an embodiment of the invention may be implemented. Chip set 900 is programmed to securely transmit payments from mobile devices lacking a physical TSM and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 4-6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method for determining an estimated work order completion time for processing a plurality of tasks associated with a work order for processing one or more video input files on one or more resources, the method comprising:
receiving the work order including information about conversion and/or transcoding, one or more output formats of the video input files and a deadline by which the work order is to be completed;
determining, utilizing at least one processor, a plurality of time duration estimates, each time duration estimate in the plurality of time duration estimates associated with a respective task in the plurality of tasks,
wherein one or more of the respective tasks involve conversion and/or transcoding of one or more of the one or more video input files;
determining one or more precedence relationships between at least two tasks in the plurality of tasks;
determining an availability of the one or more resources;
generating two or more sequences for processing the plurality of tasks based on the one or more precedence relationships to evaluate one or more estimated work order completion times associated with respective sequences in the two or more sequences;
selecting a selected estimated work order completion time from the one or more estimated work order completion times based on one or more criteria;
scheduling the plurality of tasks in a processing queue based on the selected resulting estimated work order completion time and a sequence of the two or more sequences;
determining a value of a penalty function for violating a work order deadline,
wherein the value of the penalty function is based on the deadline and/or the selected estimated work order completion time; and
processing at least one other work order to determine whether scheduling of the other work order will increase the value of the penalty function.

2. The method according to claim 1, wherein the penalty function specifies a financial cost for an actual work order completion time violating the work order deadline.

3. The method according to claim 1, wherein the estimated work order completion time is further based on an earliest availability of the one or more resources.

4. The method according to claim 1,
wherein the selected estimated work order completion time minimizes the estimated work order completion time.

5. The method according to claim 1, wherein the scheduling of the other work order increases the penalty function, the method further comprising:
initiating a rescheduling of the plurality of tasks in the processing queue based on minimizing the value of the penalty function,
wherein the rescheduling of the plurality of tasks is an iterative process.

6. The method according to claim 1, wherein the at least one work order includes one or more media files, one or more output formats, the work order deadline, or a combination thereof.

7. The method according to claim 1, wherein the at least one work, the plurality of tasks, or a combination thereof are related to raw film footage.

8. An apparatus for determining an estimated work order completion time for processing a plurality of tasks associated with a work order for processing one or more video input files on one or more resources, the apparatus comprising:
a processor; and
a memory including computer program code for one or more programs,
the memory and the computer program code configured to, with the processor, causing to perform at least the following,
receive the work order including information about conversion and/or transcoding, one or more output formats of the video input files and a deadline by which the work order is to be completed,
determine a plurality of time duration estimates, each time duration estimate in the plurality of time duration estimates associated with a respective task in the plurality of tasks,
wherein one or more of the respective tasks involve conversion and/or transcoding of one or more of the one or more video input files,
determine one or more precedence relationships between at least two tasks in the plurality of tasks,
determine an availability of the one or more resources,
generate two or more sequences for processing the plurality of tasks based on the one or more precedence relationships to evaluate one or more estimated work order completion times associated with respective sequences in the two or more sequences,
wherein the one or more estimated work order completion times are based on the plurality of time duration estimates, the one or more precedence relationships and the availability of the one or more resources,
select a selected resulting estimated work order completion time from the two or more resulting estimated work order completion times based on one or more criteria,
schedule the plurality of tasks in a processing queue based on the selected resulting estimated work order completion time and a sequence of the two or more sequences,
determine a value of a penalty function for violating a work order deadline,
wherein the value of the penalty function is based on the deadline and/or the selected estimated work order completion time, and
process at least one other work order to determine whether scheduling of the other work order will increase the value of the penalty function.

9. An apparatus according to claim 8, wherein the penalty function specifies a financial cost for an actual work order completion time violating the work order deadline.

10. An apparatus according to claim 8, wherein the estimated work order completion time is further based on an earliest availability of the one or more resources.

11. An apparatus according to claim 8,
wherein the selected estimated work order completion time minimizes the estimated work order completion time.

12. An apparatus according to claim 8, wherein the scheduling of the other work order increases the penalty function, the method further comprising, the apparatus is further configured to:
initiate a rescheduling of the plurality of tasks in the processing queue based on minimizing the value of the penalty function, wherein the rescheduling of the plurality of tasks is an iterative process.

13. The apparatus according to claim 8, wherein the at least one work order includes one or more media files, one or more output formats, the work order deadline, or a combination thereof.

14. The apparatus according to claim 8, wherein the at least one work order, the plurality of tasks, or a combination thereof are related to raw film footage.

* * * * *